US008359549B1

(12) United States Patent
Svakhin (10) Patent No.: US 8,359,549 B1
(45) Date of Patent: Jan. 22, 2013

(54) MULTIPLE-FUNCTION USER INTERACTIVE TOOL FOR MANIPULATING THREE-DIMENSIONAL OBJECTS IN A GRAPHICAL USER INTERFACE ENVIRONMENT

(75) Inventor: Nikolai A. Svakhin, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1169 days.

(21) Appl. No.: 12/208,115

(22) Filed: Sep. 10, 2008

(51) Int. Cl.
*G06F 3/00* (2006.01)
*G06F 3/048* (2006.01)

(52) U.S. Cl. ........ 715/848; 715/700; 715/764; 715/782; 715/836; 715/866

(58) Field of Classification Search .............. 715/700, 715/702, 764, 773, 782, 836, 848, 858, 866
See application file for complete search history.

(56) References Cited

U.S. PATENT DOCUMENTS

| | | | | |
|---|---|---|---|---|
| 4,766,423 A * | 8/1988 | Ono et al. | | 345/159 |
| 5,734,805 A * | 3/1998 | Isensee et al. | | 345/419 |
| 5,835,692 A * | 11/1998 | Cragun et al. | | 345/419 |
| 5,861,889 A * | 1/1999 | Wallace et al. | | 345/619 |
| 6,014,142 A * | 1/2000 | LaHood | | 715/848 |
| 6,040,839 A * | 3/2000 | Van Eldik et al. | | 345/619 |
| 6,052,115 A * | 4/2000 | Gregg et al. | | 345/159 |
| 6,057,827 A * | 5/2000 | Matthews | | 345/420 |
| 6,144,381 A * | 11/2000 | Lection et al. | | 715/850 |
| 6,281,903 B1 * | 8/2001 | Martin et al. | | 345/421 |
| 6,664,986 B1 * | 12/2003 | Kopelman et al. | | 715/849 |
| 7,016,824 B2 * | 3/2006 | Waupotitsch et al. | | 703/6 |
| 7,205,991 B2 | 4/2007 | Fitzmaurice et al. | | |
| 7,227,328 B2 * | 6/2007 | Haunerdinger | | 318/569 |
| 7,263,670 B2 * | 8/2007 | Rekimoto | | 715/837 |
| 7,439,975 B2 * | 10/2008 | Hsu | | 345/426 |
| 7,623,697 B1 * | 11/2009 | Hughes et al. | | 382/133 |
| 7,739,623 B2 * | 6/2010 | Liang et al. | | 715/848 |
| 7,782,319 B2 * | 8/2010 | Ghosh et al. | | 345/427 |
| 7,986,318 B2 * | 7/2011 | Kurtenbach et al. | | 345/419 |
| 8,127,248 B2 * | 2/2012 | Ording et al. | | 715/790 |
| 2002/0111204 A1 * | 8/2002 | Lupo | | 463/9 |
| 2003/0156126 A1 * | 8/2003 | Tsuji | | 345/660 |
| 2004/0003350 A1 * | 1/2004 | Simmons et al. | | 715/517 |
| 2005/0028111 A1 * | 2/2005 | Schrag et al. | | 715/851 |
| 2006/0025679 A1 * | 2/2006 | Viswanathan et al. | | 600/424 |
| 2006/0058616 A1 * | 3/2006 | Marquart et al. | | 600/407 |
| 2006/0125822 A1 * | 6/2006 | Kurtenbach et al. | | 345/419 |
| 2006/0200780 A1 * | 9/2006 | Iwema et al. | | 715/810 |
| 2006/0258938 A1 * | 11/2006 | Hoffman et al. | | 600/424 |
| 2008/0122786 A1 * | 5/2008 | Pryor et al. | | 345/156 |
| 2008/0273029 A1 * | 11/2008 | Brennan | | 345/420 |
| 2009/0044136 A1 * | 2/2009 | Flider et al. | | 715/764 |
| 2009/0160985 A1 * | 6/2009 | Javidi et al. | | 348/294 |
| 2009/0217209 A1 * | 8/2009 | Chen et al. | | 715/856 |

OTHER PUBLICATIONS

Lee Ambrosius, AutoCAD 2008 3D Modeling Workbook for Dummies, Oct. 1, 2007, 5 pages.*

Schmidt et al., "Sketching and Composing Widgets for 3D Manipulation", The Eurographics Association and Blackwell Publishing 2007, Eurographics 2008, vol. 27, No. 3, 10 pages, 2008.

(Continued)

*Primary Examiner* — Matt Kim
*Assistant Examiner* — Yongjia Pan (57) ABSTRACT

Methods and apparatuses are provided which may be implemented to provide a multiple-function user interactive tool adapted for manipulating three-dimensional objects graphically presented within a virtual space.

25 Claims, 4 Drawing Sheets

OTHER PUBLICATIONS

Wiegers, "Interaction with 3D VTK widgets" *A quantitative study on the influence of 2DOF and 6DOF input devices on user performance*, Master Thesis Software Engineering, 33 pages, Aug. 11, 2006,.

Elmquist et al., "Reducing Occlusion in 3D Environments Through Smooth Camera Projection Animation" Technical Report No. 2005-11, Goteborg University, 19 pages, 2005.

* cited by examiner

MULTIPLE-FUNCTION USER INTERACTIVE TOOL FOR MANIPULATING THREE-DIMENSIONAL OBJECTS IN A GRAPHICAL USER INTERFACE ENVIRONMENT

BACKGROUND

1. Field

The subject matter disclosed herein relates to graphical computer interfaces, and more particularly to methods and apparatuses associated with user interactive tools adapted for manipulating three-dimensional objects graphically presented within a virtual space.

2. Information

Computer aided design and/or other like graphics editing programs may be adapted to allow users to interact in some manner, for example, through a graphical user interface environment, with modeled or otherwise rendered three-dimensional objects. Such three-dimensional objects may be projected or otherwise rendered as needed for a two-dimensional display and/or print.

Interactive tools may be provided to allow a user to selectively manipulate the three-dimensional objects within a virtual space. Such manipulation may be controlled, for example, through a user interface device such as a mouse, trackball, joy stick, etc. For example, certain programs may provide a rotate tool that may be adapted to allow a user to selectively rotate a three dimensional object. Certain programs may provide a movement tool that may be adapted to allow a user to selectively move a three-dimensional object to different locations within a modeled space. Some programs may provide a scaling tool that may be adapted to allow a user to selectively change the scale of a three-dimensional object.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Certain exemplary methods and apparatuses are provided herein which may be adapted to provide a multiple-function user interactive tool for use within a graphical user interface environment. The user interactive tool may, for example, be adapted to allow for a user to selectively manipulate (e.g., move, rotate, and/or scale) a three-dimensional object. Such user interactive tool may be implemented within a computer application and/or other like program, for example, as a widget and/or other like capability. Such user interactive tool may be integral to an application, such as, e.g., a computer aided design and/or other like graphics editing program, and/or provided through a plug-in, and/or other like extension program adapted to interact with one or more host applications, etc. In certain implementations, such a user interactive tool may be implemented using one or more application programming interfaces, or the like.

In certain aspects, the methods and apparatuses provided herein may be implemented to promote a more efficient user experience since a single interactive tool may be adapted to provide multiple-functions. By way of example but not limitation, as described in more detail below in certain example implementations a single user interactive tool may include a plurality of selector portions that may be adapted to allow the user to selectively perform multiple functions such as: (1) moving a three-dimensional object along at least one axis using at least one axial movement selector portion; (2) moving a three-dimensional object along at least one plane or non-planar surface using at least one 2D movement control selector portion; (3) rotating a three-dimensional object about at least one axis using at least one axial rotation selector portion; (4) scaling a three-dimensional object along at least one axis using at least one axial scaling selector portion; and (5) scaling a three dimensional object using a uniform scaling selector portion.

As described in more detail below, in certain example implementations, a user interactive tool may be adapted to provide a first selector portion that may be adapted to be selected in a first manner (e.g., mouse click) to access the functionality of a uniform scaling selector portion. Such a first selector portion may also be selected in a second manner (e.g., mouse over, hover over, etc.) to initiate access to the functionality of a 2D movement control selector portion. Here, in response to selecting/initiating the functionality of a 2D movement control selector portion, a corresponding indicator portion and/or other like user feedback may be presented. For example, if the cursor has been hovering over a selectable region or other like feature for a threshold period of time and such 2D movement control selector portion functionality may be acknowledged or otherwise selected by the user with a subsequent mouse click or other like user input.

In accordance with an aspect of the present description, once the functionality of a 2D movement control selector portion is selected or otherwise invoked, an indicator portion may be selectively displayed by the user interactive tool in such a manner as to avoid operatively occluding (e.g., preventing selection of) the other selector portions provided by the tool.

Thus, in accordance with certain exemplary aspects, a method may include associating a user interactive tool with at least one object that may be adapted for manipulation within a graphical user interface environment, and at least initiating presentation of the user interactive tool having at least one selector portion and an indicator portion within the graphical user interface environment. The indicator portion may be selectively positioned to avoid operatively occluding the selector portion(s). For example, in certain implementations such an indicator portion may be positioned and/or otherwise graphically depicted in two or more manners depending on the orientation of the user interactive tool (and object). If it is determined that the indicator portion may operatively occlude one or more selector portions if presented in a first position, then the indicator portion may be selectively presented in a second position that does not operatively occlude the selector portions. The terms "selectively positioned" may, as in this example, include relocating and/or repositioning an indicator portion within the user interactive tool. In other exemplary implementations, the terms "selectively positioned" may additionally and/or alternatively include changing one or more features associated with the indicator portion. Thus, by way of example but not limitation "selectively positioned" may include selectively affecting features such as position, shape, color, transparency, texture, animation, and/or the like.

In certain example implementations the user interactive tool may include a first selector portion, such as, e.g., a uniform scaling selector portion, and one or more axial controller portions extending outwardly (e.g., in orthogonal directions) from the first selector portion. Each axial controller portion may include, for example, an axial movement selector portion, an axial rotation selector portion, an axial scaling selector portion, and/or the like.

The first selector portion may include, for example, one or more selectable regions, selectable edges, and/or the like that if selected may activate a 2D movement controller. Such activation may, for example, introduce an indicator portion that may extend outwardly from the first selector portion.

In accordance with another exemplary aspect, a method may include associating a user interactive tool with at least one object adapted for manipulation within a graphical user interface environment, and at least initiating presentation of the user interactive tool within the graphical user interface environment. Here, such user interactive tool may include a first selector portion having a plurality of regions and a plurality of axial controller portions extending outwardly from certain ones of the plurality of regions. Each axial controller portion may be associated with a different axis of the object and may include an axial movement selector portion, an axial rotation selector portion, and an axial scaling selector portion. In certain example implementations, the first selector portion may include a uniform scaling selector portion.

In accordance with other exemplary aspects, an apparatus may include memory and at least one processing unit operatively coupled to the memory. Here, the memory may be adapted to store data associated at least one object adapted for manipulation within a graphical user interface environment. The processing unit(s) may be adapted (e.g., through computer implementable instructions that may be stored on a computer readable medium) to associate a user interactive tool with the object within the graphical user interface environment. The processing unit(s) may be adapted to at least initiate presentation of the user interactive tool within the graphical user interface environment. As presented, the user interactive tool may include at least one selector portion and an indicator portion, wherein the indicator portion may be selectively positioned to not operatively occlude the selector portion(s). The processing unit may also be adapted to implement and/or otherwise support user manipulation of the object and/or data associated with the object.

Figure 1:
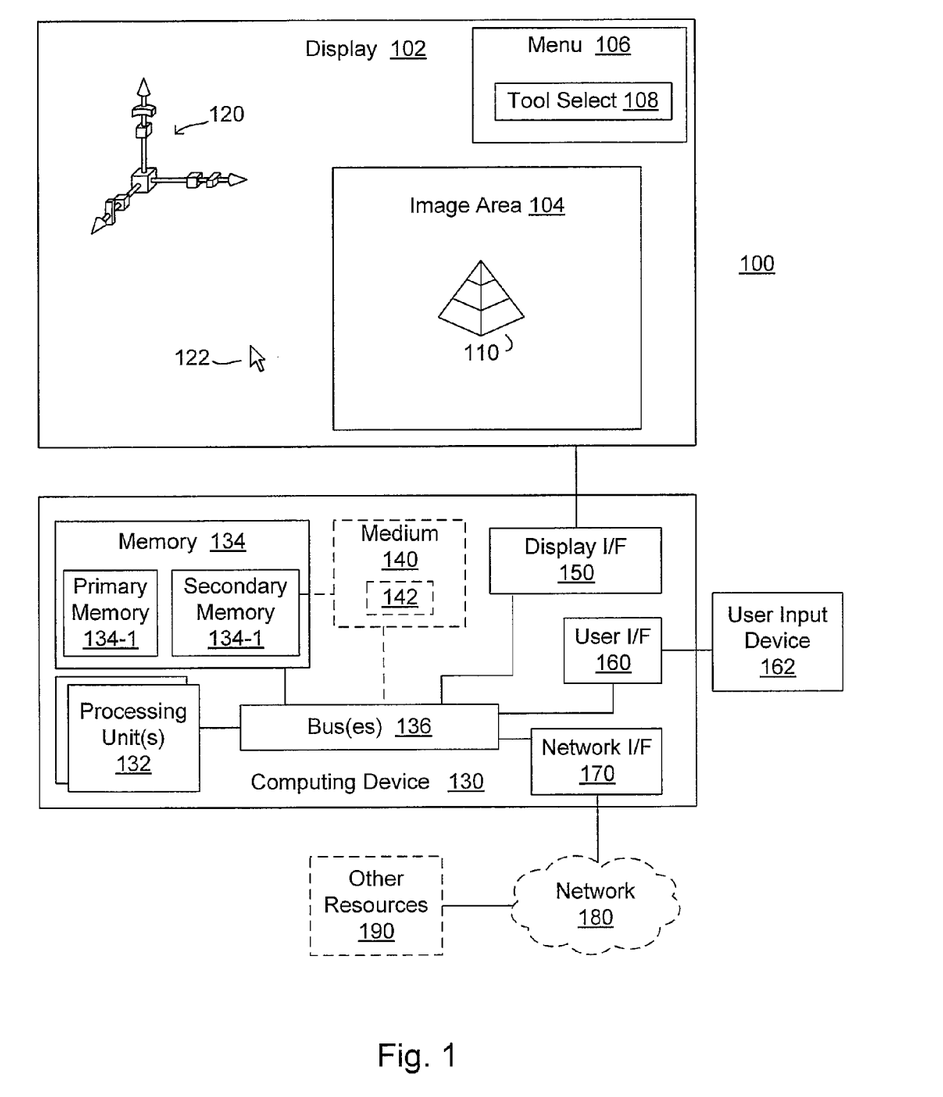
FIG. 1 is a block diagram illustrating an exemplary computing environment that may be adapted to provide a graphical user interface environment having a user interactive tool in accordance with certain implementations.

Reference is now made to FIG. 1, which is a block diagram illustrating an exemplary computing environment adapted to provide a graphical user interface environment 100. In this example, at least one display device 102 may be operatively coupled to at least one computing device 130. As shown, display device 102 may, for example, be adapted to selectively present an image area 104, a menu 106, a tool select item 108, an object 110, a user interactive tool 120, a cursor 122, and/or the like as directed by computing device 130. Image area 104 may include all or part of display 102. There may be one or more image areas 104. Menu 106 may graphically include one or more user selectable menu items including, for example, tool select item 108. Tool select item 108 may be interactively selected or otherwise invoked by a user to activate user interactive tool 120. User interactive tool 120 may be adapted to allow the user to manipulate object 110 in some manner based on user input. Such user input may, for example, be associated with a user input device 162 which may be controllably associated with cursor 122.

Object 110 is representative of any three-dimensional object that may be represented by data capable of being processed by computing device 130. While display device 102 is illustrated as presenting a two-dimensional image of object 110, it should be understood that in other example implementations display device may be adapted to provide a virtual three-dimensional image of object 110. Display device 102 is representative of any type of display, projector, and/or the like, which may be adapted to display computer generated graphical data. Such two-dimensional and/or three-dimensional display devices are known and beyond the scope of this description.

While user interactive tool 120 is shown in this example as being presented outside of image area 104, it should be understood that in other implementations user interactive tool 120 may be presented within image area 104, and/or other areas within display 102.

The shape/features of user interactive tool 120 in the drawings herein is intended to demonstrate an example implementation and to not limit claimed subject matter, since other implementations may be implemented. For example, in the drawings user interactive tool 120 is illustrated as being associated with Cartesian coordinate system having an x-axis, y-axis and z-axis, however, this is just one example implementation and claimed subject matter is not intended to be limited in this manner. For example, in certain implementations a system having two or more non-orthogonal axes may be implemented, and/or a non-axial based coordinate system may be implemented.

Computing device 130 may be representative of one or more devices that may be adapted to accept or otherwise access user input and based, at least in part, on such user input generate and provide graphical data to display device 102 for presentation. As shown in the example of FIG. 1, computing device 130 may include one or more processing units 132 that may be adapted to process user inputs to generate such graphical data in accordance with one or more instructions associated with one or more computing programs, applications, operating systems, etc.

By way of example but not limitation, a processing unit 132 may include a microprocessor and/or the like. Processing unit(s) 132 may be operatively coupled to memory 134, for example, via at least a portion of at least one bus 136 and/or other resources 136. Memory 134 may, for example, include a primary memory 134-1 such as a random access memory, and/or the like. In certain implementations, all or part of primary memory may be provided within or without the same circuit component(s) with at least one of processing unit 132. Memory 134 may, for example, include a secondary memory 134-2, which may include a data storage device adapted to provide non-volatile data storage. By way of example but not limitation secondary memory 134-2 may include a hard disk drive, optical disc drive, solid state drive, etc.

A computer readable medium 140 may, for example, be provided with computer implementable instructions 142 stored thereon. Computer readable medium 140 may, for example, be associated with secondary memory 134-2, and/or may be adapted to be accessed in other ways by processing unit(s) 132, e.g., via bus 136, etc. Computer readable medium 140 may, for example, include any data storage medium that may store such instructions 142 and/or other like data. Such computer readable medium 140 may, for example, represent an article of manufacture.

Processing unit(s) 132 may, for example, be adapted to provide graphical data as generated to a display interface 150 via bus 136 and/or memory 134. Display interface 150 may be adapted to operatively couple computing device 130 to display 102, for example. By way of example but not limitation, display interface 150 may include a graphics processing unit (not shown) and video memory (not shown) that may be adapted to render and/or otherwise generate data suitable for display by display device 102 based, at least in part, on the graphical data from processing unit(s) 132 and/or a user interface 160. Here, for example, display interface 150 may be operatively coupled to bus 136.

User interface 160 may be adapted to operatively couple computing device 130 to at least one user input device 162. User input device 162 may, for example, include a keyboard, keypad, touch screen, mouse, trackball, joystick, camera, microphone, and/or other like user input device.

Computing device 130 may also include a network interface 170 that may be adapted to provided communication with one or more other computing devices and/or other like resources. For example, network interface 170 may be adapted to operatively couple computing device 130 to at least one network 180 and/or other resources 190. Network 180 may be representative of any communication system, including, for example, the Internet. Resources 190 may be representative of one or more computing and/or other like devices that may exchange data and/or instructions with computing device 130. The techniques provided herein may, be implemented using one computing device and/or may be implemented in a distributed or other like manner using two or more computing devices and/or other like resources. Such computing and communication devices, systems, interfaces, and/or operative coupling techniques are well known.

Figures 2, 3, 4:
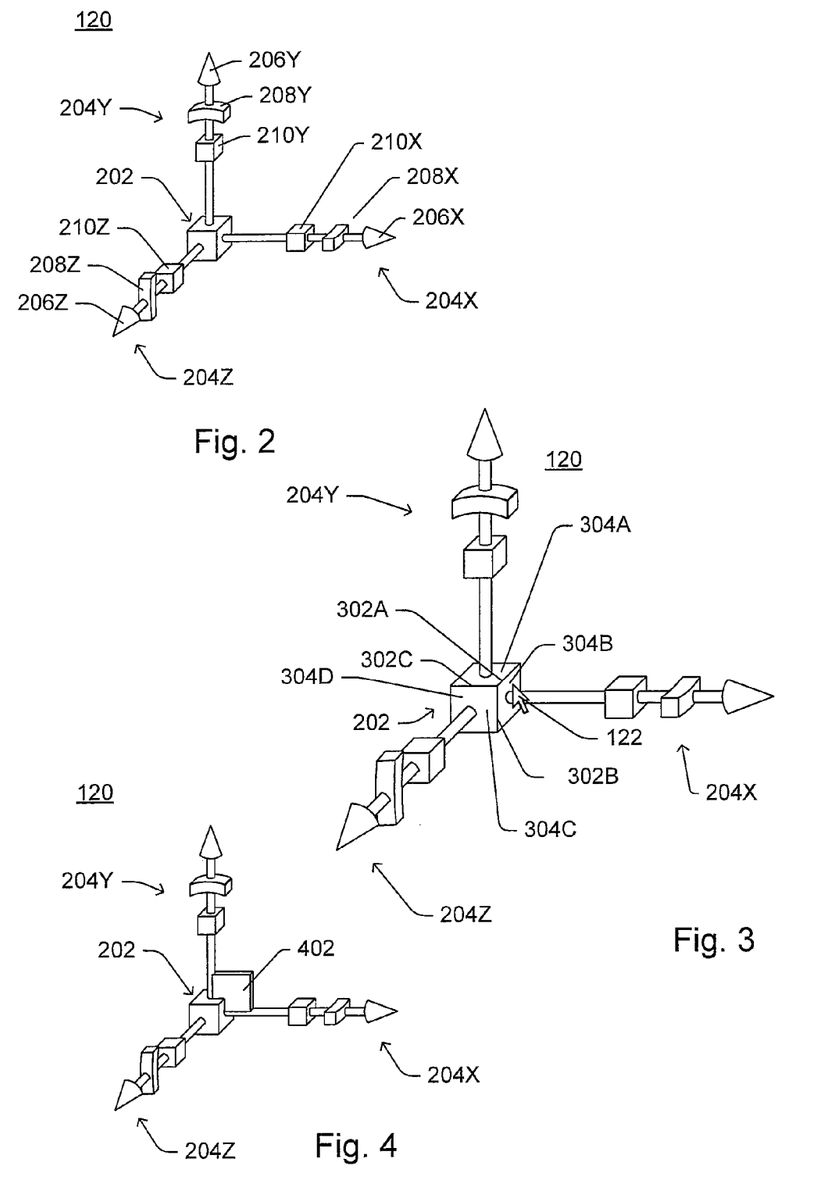
FIG. 2 is an illustrative depiction of an exemplary user interactive tool that may be adapted for use in a graphical user interface environment, for example, as in FIG. 1, in accordance with certain implementations.
FIG. 3 is an illustrative depiction of an exemplary user interactive tool, as in FIG. 2, showing user interaction and activation of an exemplary selector portion.
FIGS. 4-6 are illustrative depictions of exemplary user interactive tools, as in FIG. 2, showing an indicator portion following activation of an exemplary selector portion.

Attention is drawn next to FIG. 2, which illustrates an exemplary two-dimensional representation of user interactive tool 120 as might be presented using display device 102.

Here, in this example implementation, user interface tool 120 includes a first selector portion 202 represented by a cube. In certain example, implementations, first selector portion 202 may be adapted as a uniform scaling selector portion such that if activated allows object 110 to be uniformly scaled in three-dimensions based, at least in part, on input from user input device 162.

Additionally and/or alternatively, in certain example implementations, first selector portion 202 may be selectively adapted as a 2D movement control selector portion. For example, as described in greater detail below, first selector portion 202 may include one or more selectable regions, selectable edges, and/or the like, that if activated allows object 110 to be moved in two-dimensions, e.g., via two input signals/data from user input device 162.

In the example illustrated in FIG. 2, a plurality of axial controller portions 204X, 204Y and 204Z, extend outwardly from different regions of first selector portion 202. Such axial controller portions may be adapted to provide different axial based controllers that if activated allows object 110 to be manipulated in some manner with respect to an applicable axis based on input from user input device 162.

For example, axial controller portion 204X may be associated with an x-axis and a y-axis (e.g., for rotation) of object 110. Axial controller portion 204X may include one or more selector portions, such as, axial movement selector portion 206X that if activated allows object 110 to be selectively moved along the x-axis, an axial rotation selector portion 208X that if activated allows object 110 to be selectively rotated about the y-axis, and/or an axial scaling selector portion 210X that if activated allows object 110 to be selectively (non-uniformly) scaled with respect to the x-axis.

Similarly, axial controller portion 204Y may be associated with a y-axis and a z-axis (e.g., for rotation) of object 110. Axial controller portion 204Y may include one or more selector portions, such as, axial movement selector portion 206Y that if activated allows object 110 to be selectively moved along the y-axis, an axial rotation selector portion 208Y that if activated allows object 110 to be selectively rotated about the z-axis, and/or an axial scaling selector portion 210Y that if activated allows object 110 to be selectively (non-uniformly) scaled with respect to the y-axis.

Axial controller portion 204Z may be associated with a z-axis and an x-axis (e.g., for rotation) of object 110. Axial controller portion 204Z may include one or more selector portions, such as, axial movement selector portion 206Z that if activated allows object 110 to be selectively moved along the z-axis, an axial rotation selector portion 208Z that if activated allows object 110 to be selectively rotated about the x-axis, and/or an axial scaling selector portion 210Z that if activated allows object 110 to be selectively (non-uniformly) scaled with respect to the z-axis.

The various selector portions in the example implementation of user interactive tool 120 above may, for example, be activated by the user selectively placing a cursor over a desired portion, clicking a mouse button, entering one or more keyboard commands, and/or one or more other like user inputs.

With this in mind, reference is now made to FIG. 3, which is similar to FIG. 2 and further illustrates certain exemplary features of user interactive tool 120. Here, for example, based on user input, cursor 122 may be moved and placed over a desired selectable region 304B of first selector portion 202.

First selector portion 202 may have a plurality of selectable regions 304 and/or selectable features 302. As shown using labels in this example, first selector portion 202 may include selectable regions 304A-D, and/or selectable features 302A-C. In this example, first selector portion 202 has the shape of a cube and as such the selectable regions 304 may include one or more surfaces of the cube and/or portions of such surfaces, and/or selectable features 302 may include one or more edges and/or portions thereof formed where the surfaces meet. It should be recognized, however, that a cube this is just one example and that other shapes may be implemented.

In certain exemplary implementations, if cursor 122 "hovers over" (e.g., for a threshold period of time, etc.) at least a portion of a selectable region and/or feature then first selector portion may be activated as a 2D movement controller. For example, if cursor 122 hovers over at least a portion of selectable regions 304A, 304B and/or feature 302A then first selector portion may be activated as a 2D movement controller that allows the user to move object 110 within an X-Y plane. Such activation may be illustrated, for example, by user interactive tool 120, as shown in similar FIG. 4, by adding an indicator portion 402. Here, indicator portion 402 may be designed to let the user know that a 2D movement controller may be activated and user input may move object 110 within the illustrated X-Y plane.

Figure 5:
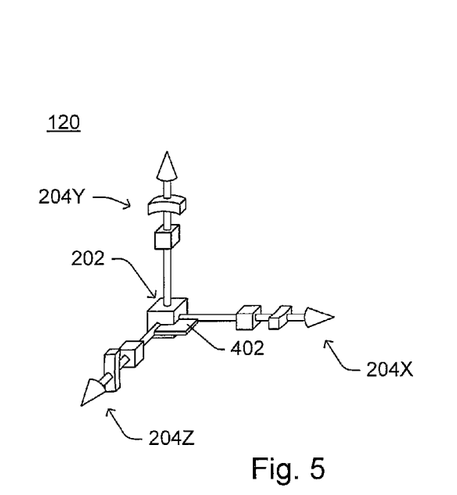

For example, if cursor 122 hovers over at least a portion of selectable regions 304C and/or feature 302B then first selector portion may be activated as a 2D movement controller that allows the user to move object 110 within an X-Z plane. Such activation may be illustrated, for example, by user interactive tool 120, as shown in similar FIG. 5, by adding indicator portion 402. In FIG. 5, indicator portion 402 may be designed to let the user know that a 2D movement controller may be activated and user input may move object 110 within the illustrated X-Z plane.

Figure 6:
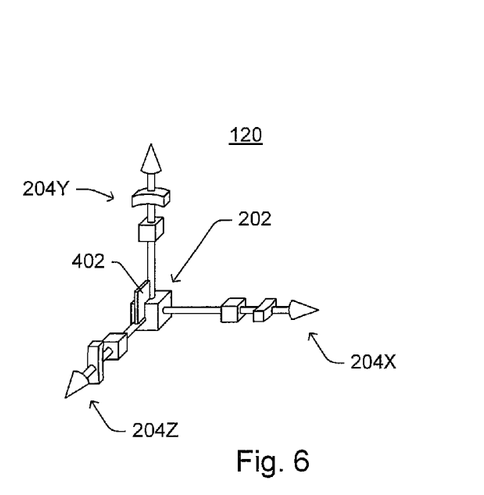

Similarly, if cursor 122 hovers over at least a portion of selectable regions 304D and/or feature 302C then first selector portion may be activated as a 2D movement controller that allows the user to move object 110 within a Y-Z plane. Such activation may be illustrated, for example, by user interactive tool 120, as shown in similar FIG. 6, by adding indicator portion 402. In FIG. 6, indicator portion 402 may be designed to let the user know that a 2D movement controller may be activated and user input may move object 110 within the illustrated Y-Z plane.

Hence, in the above example, first selector portion 202 may be easily and/or identifiably activated to allow for selected 2D movement control. While illustrated in these examples as providing a 2D plane, it should be understood that in other implementations, non-planar 2D movement control may be provided for in such and/or similar manner.

Figure 7:
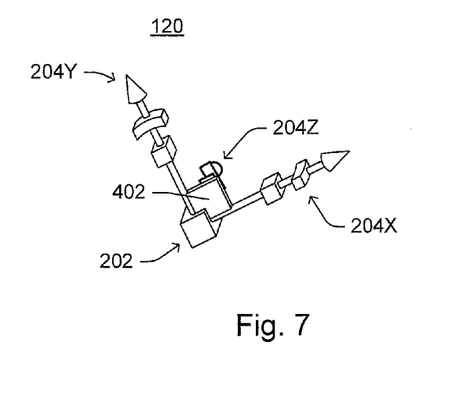
FIG. 7 is an illustrative depiction of an exemplary user interactive tool, as in FIG. 2 but in a different presented orientation, showing an indicator portion that may operatively occlude one or more exemplary selector portions.
Figure 8:
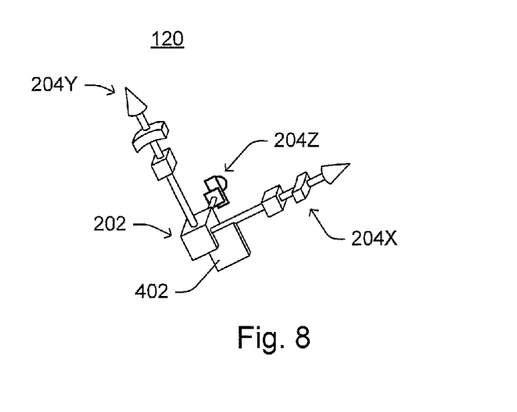
FIGS. 8 and 9 are illustrative depictions of exemplary user interactive tools, as in FIG. 7, showing an indicator portion selectively arranged to avoid operatively occluding one or more exemplary selector portions.
Figure 9:
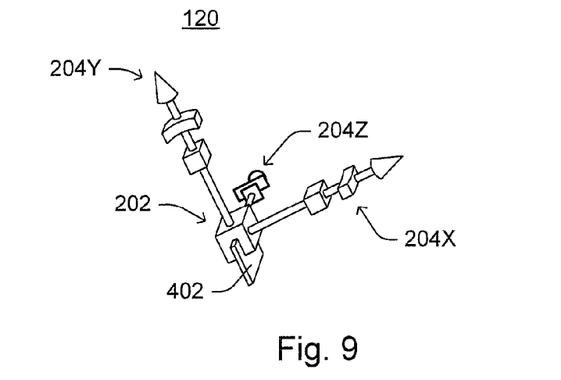

Reference is now made to FIGS. 7 through 9, which are similar to FIGS. 2-6, but which illustrate by way of example, how an exemplary indicator portion 402 may be selectively positioned to avoid potentially operatively occluding certain other selectable portions of user interactive tool 120.

FIG. 7 illustrates that an exemplary orientation that user interactive tool 120 may have as a result of use interaction (e.g., object manipulation). However, as illustrated in FIG. 7, if the functionality of a 2D movement control selector portion is selected or otherwise invoked for the X-Y plane, then indicator portion 402 may be operatively occlude other selectable portions. For example, all or part of one or more of the selectable portions of first selector portion 202 may be opertively occluded, and/or all or part of one or more of the selectable portions of axial control portion 204Z may be opertively occluded by indicator portion 402 in certain orientations. Moreover, the location of such indicator portion 402 may complicate and/or otherwise affect the user experience in some manner.

Thus, in accordance with certain implementations, as illustrated in FIG. 8, if the functionality of a 2D movement control selector portion is selected or otherwise invoked, indicator portion 402 may be selectively displayed as part of user interactive tool 120 in such a manner to avoid operatively occluding (e.g., preventing selection of) the other selectable portions. As shown in the example of FIG. 8, indicator portion 402 may be positioned in a complimentary and/or other related position with regard to either of the selected plane (here, the X-Y plane) and/or the selectable regions/features, etc., associated with first selector portion 202. As previously mentioned, but not shown in this example, it should be recognized that various features associated with an indicator portion may be selected affected to avoid operatively occluding one or more selectable portions.

Similarly, as shown in the example of FIG. 9, indicator portion 402 may be positioned in a complimentary and/or other related position with regard to either of the selected plane (here, the Y-Z plane) and/or the selectable regions/features, etc., associated with first selector portion 202.

In certain example implementations, indicator portion 402 may be deactivated, hidden and/or otherwise removed from the graphical presentation of user interactive tool 120 if the user interactive tool is being manipulated and/or otherwise selectable portions thereof are being interacted with. Thus, for example, indicator portion 402 in FIG. 9 may be hidden if user interactive tool 120 is being used to rotate or otherwise manipulate object 110.

Figure 10:
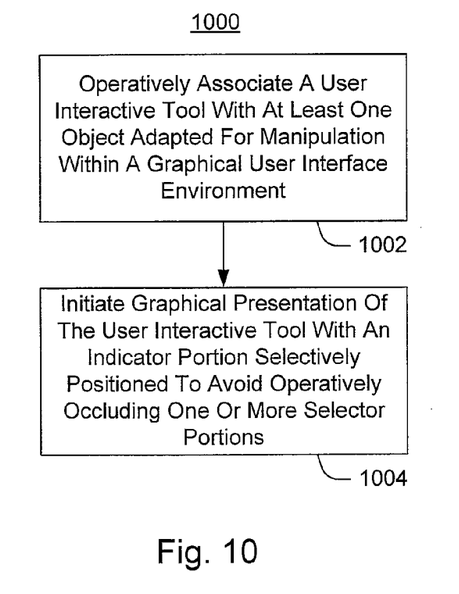
FIG. 10 is a flow diagram illustrating an exemplary method that may, for example, be implemented to provide a user interactive tool that may be adapted for use in a graphical user interface environment, for example, as in FIG. 1, in accordance with certain implementations.

Reference is now made to FIG. 10, which is a flow diagram illustrating an exemplary method 1000 that may be implemented, for example, in a graphical user interface environment 100.

At block 1002, a user interactive tool may be operatively associated in some manner with at least one object that may be adapted for manipulation within a graphical user interface environment.

At block 1004, graphical presentation of the user interactive tool may be initiated within the graphical user interface environment. Here, for example, such user interactive tool may be graphically presented as having at least one selector portion and an indicator portion. Such an indicator portion may be selectively positioned to avoid operatively occluding one or more selector portions.

Figure 11:
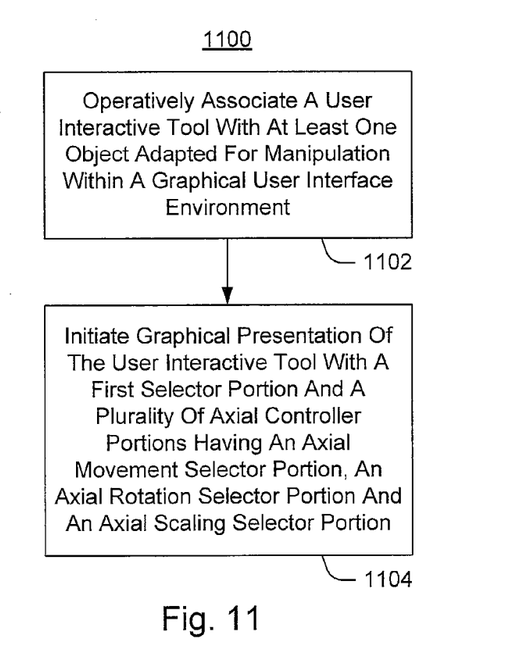
FIG. 11 is a flow diagram illustrating an exemplary method that may, for example, be implemented to provide a user interactive tool that may be adapted for use in a graphical user interface environment, for example, as in FIG. 1, in accordance with certain implementations.

Reference is now made to FIG. 11, which is a flow diagram illustrating an exemplary method 1100 that may be implemented, for example, in a graphical user interface environment 100.

At block 1102, a user interactive tool may be associated in some manner with at least one object that may be adapted for manipulation within a graphical user interface environment.

At block 1104, graphical presentation of the user interactive tool may be initiated within the graphical user interface environment. Here, for example, such user interactive tool may be graphically presented as having a first selector portion with a plurality of regions and a plurality of axial controller portions extending outwardly from certain regions. Each of the axial controller portions may be operatively associated with a different axis of the object and may include an axial movement selector portion, an axial rotation selector portion and an axial scaling selector portion.

While certain exemplary techniques have been described and shown herein using various methods and apparatuses, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all implementations falling within the scope of the appended claims, and equivalents thereof.

What is claimed is:

1. A method, comprising:

associating a user interactive tool with at least one three-dimensional (3D) object adapted for manipulation within a graphical user interface environment;

presenting said user interactive tool within said graphical user interface environment to facilitate manipulation of said 3D object, said user interactive tool comprising an indicator portion indicating a plane of movement for said 3D object, said indicator portion being selectively positioned to not operatively occlude one or more other portions of said user interactive tool;

depending on a change in orientation of the user interactive tool and said 3D object, determining that said indicator portion operatively occludes said one or more other portions of said user interactive tool; and in response to said determining, selectively moving said indicator portion to a different location on said user interactive tool so as to not operatively occlude said one or more other portions of said user interactive tool.

2. The method as recited in claim 1, wherein said user interactive tool comprises a first selector portion and at least one axial controller portion extending outwardly from said first selector portion, said at least one axial controller portion comprising at least one of an axial movement selector portion, an axial rotation selector portion, and/or an axial scaling selector portion, and wherein said one or more other portions comprises at least one of said first selector portion, said axial movement selector portion, said axial rotation selector portion, and/or said axial scaling selector portion, the method further comprising:

receiving input to said first selector portion or said axial controller portion to manipulate said 3D object.

3. The method as recited in claim 2, wherein said first selector portion comprises a uniform scaling selector portion and said user interactive tool comprises a plurality of axial controller portions extending outwardly in orthogonal directions from uniform scaling selector portion, the method further comprising:

receiving input to said uniform scaling selector portion or one of the plurality of axial controller portions to manipulate said 3D object.

4. The method as recited in claim 2, wherein said first selector portion comprises at least one of a selectable region and/or a selectable feature, and wherein said indicator portion is associated with a selection of said at least one of said selectable region and/or said selectable feature, and said indicator portion extends outwardly from said first selector portion, the method further comprising:

receiving input to the selectable region or the selectable feature; and in response to said receiving input, selectively positioning said indicator portion to not operatively occlude said at least one of said selectable region and/or said selectable feature.

5. The method as recited in claim 4, wherein said indicator portion is associated with a two-dimension movement controller, the method further comprising:

receiving input to said two-dimensional movement controller to move said 3D object in said plane.

6. A method, comprising:

associating a user interactive tool with at least one three-dimensional (3D) object, wherein the user interactive tool is adapted for 3D manipulation of the at least one 3D object within a graphical user interface environment;

initiating presentation of said user interactive tool within said graphical user interface environment, said user interactive tool comprising a first selector portion having a plurality of regions and a plurality of axial controller portions extending outwardly from certain ones of said plurality of regions, wherein each of said axial controller portions is associated with a different axis of said at least one 3D object and comprises an axial movement selector portion, an axial rotation selector portion and an axial scaling selector portion;

receiving input to the first selector portion selecting a uniform scaling operation for uniformly scaling the at least one 3D object in 3D or a two-dimensional (2D) movement operation for moving the at least one 3D object in 2D;

receiving input to the axial movement selector portion of one of the plurality of axial controller portions for moving the at least one 3D object along a corresponding axis;

receiving input to the axial rotation selector portion of one of the plurality of axial controller portions for rotating the at least one 3D object about a particular axis; and receiving input to the axial scaling selector portion of one of the plurality of axial controller portions for non-uniformly scaling the at least one 3D object with respect to a corresponding axis.

7. The method as recited in claim 6, wherein said user interactive tool further comprises an indicator portion extending outwardly from at least one of said plurality of regions, said indicator portion being selectively positioned to not operatively occlude user selection of said first selector portion, and/or any of said axial movement selector portions, said axial rotation selector portions, and/or said axial scaling selector portions.

8. The method as recited in claim 7, wherein said first selector portion comprises at least one of a selectable region and/or a selectable feature, and wherein said indicator portion is associated with a selection of said at least one of said selectable region and/or said selectable feature.

9. The method as recited in claim 8, wherein said indicator portion is associated with a two-dimension movement controller.

10. The method as recited in claim 6, wherein said first selector portion comprises a uniform scaling selector portion.

11. An apparatus, comprising:

memory adapted to store data associated with at least one three-dimensional (3D) object adapted for manipulation within a graphical user interface environment; and at least one processing unit operatively coupled to said memory and adapted to:

associate a user interactive tool with said at least one 3D object within said graphical user interface environment, and present said user interactive tool within said graphical user interface environment to facilitate manipulation of said 3D object, said user interactive tool comprising an indicator portion indicating a plane of movement for said 3D object, said indicator portion being selectively positioned to not operatively occlude one or more other portions of said user interactive tool;

depending on a change in orientation of the user interactive tool and said 3D object, determine that said indicator portion operatively occludes said one or more other portions of said user interactive tool; and in response to determining that said indicator portion operatively occludes said one or more other portions of said user interactive tool, selectively move said indicator portion to a different location on said user interactive tools so as to not operatively occlude said one or more other portions of said user interactive tool.

12. The apparatus as recited in claim 11, wherein said user interactive tool comprises a first selector portion and at least one axial controller portion extending outwardly from said first selector portion, said at least one axial controller portion comprising at least one of an axial movement selector portion, an axial rotation selector portion, and/or an axial scaling selector portion,     wherein said one or more other portions comprises at least one of said first selector portion, said axial movement selector portion, said axial rotation selector portion, and/or said axial scaling selector portion, and     wherein said first selector portion and/or said axial controller portion are configured to receive input to manipulate said 3D object.

13. The apparatus as recited in claim 12, wherein said first selector portion comprises a uniform scaling selector portion and said user interactive tool comprises a plurality of axial controller portions extending outwardly in orthogonal directions from said uniform scaling selector portion, wherein said uniform scaling selector portion and/or the plurality of axial controller portions are configured to receive input to manipulate said 3D object.

14. The apparatus as recited in claim 12, wherein said first selector portion comprises at least one of a selectable region and/or a selectable feature,     wherein said indicator portion is associated with a selection of said at least one of said selectable region and/or said selectable feature, and said indicator portion extends outwardly from said first selector portion, and     wherein said at least one processing unit is further adapted to selectively position said indicator portion, in response to input to said selectable region or said selectable feature, to not operatively occlude said at least one of said selectable region and/or said selectable feature.

15. The apparatus as recited in claim 14, wherein said indicator portion is associated with a two-dimension movement controller, wherein said two-dimension movement controller is further configured to receive input to move said 3D object in said plane.

16. A non-transitory computer readable medium comprising computer implementable instructions stored thereon, which if implemented by one or more processing units adapts the one or more processing units to:

associate a user interactive tool with at least one object adapted for manipulation within a graphical user interface environment;

present said user interactive tool within said graphical user interface environment to facilitate manipulation of said 3D object, said user interactive tool comprising an indicator portion indicating a plane of movement for said 3D object, said indicator portion being selectively positioned to not operatively occlude one or more other portions of said user interactive tool;

depending on a change in orientation of the user interactive tool and said 3D object, determine that said indicator portion operatively occludes said one or more other portions of said user interactive tool; and     in response to said determining, selectively move said indicator portion to a different location on said user interactive tool so as to not operatively occlude said one or more other portions of said user interactive tool.

17. The non-transitory computer readable medium as recited in claim 16, wherein said user interactive tool comprises a first selector portion and at least one axial controller portion extending outwardly from said first selector portion, said at least one axial controller portion comprising at least one of an axial movement selector portion, an axial rotation selector portion, and/or an axial scaling selector portion,     wherein said one or more other portions comprises at least one of said first selector portion, said axial movement selector portion, said axial rotation selector portion, and/or said axial scaling selector portion, and     wherein said first selector portion and/or said axial controller portion are configured to receive input to manipulate said 3D object.

18. The non-transitory computer readable medium as recited in claim 17, wherein said first selector portion comprises a uniform scaling selector portion and said user interactive tool comprises a plurality of axial controller portions extending outwardly in orthogonal directions from uniform scaling selector portion, wherein said uniform scaling selector portion and/or the plurality of axial controller portions are configured to receive input to manipulate said 3D object.

19. The non-transitory computer readable medium as recited in claim 16, wherein said first selector portion comprises at least one of a selectable region and/or a selectable feature,     wherein said indicator portion is associated with a selection of said at least one of said selectable region and/or said selectable feature, and said indicator portion extends outwardly from said first selector portion, and     wherein said at least one processing unit is further adapted to selectively position said indicator portion, in response to input to said selectable region or said selectable feature, to not operatively occlude at least one of said selectable region and/or said selectable feature.

20. The non-transitory computer readable medium as recited in claim 19, wherein said indicator portion is associated with a two-dimension movement controller, wherein said two-dimension movement controller is further configured to receive input to move said 3D object in said plane.

21. A non-transitory computer readable medium comprising computer implementable instructions stored thereon, which if implemented by one or more processing units adapts the one or more processing units to:

associate a user interactive tool with at least one three-dimensional (3D) object, wherein the user interactive tool is adapted for 3D manipulation of the at least one 3D object within a graphical user interface environment;

initiate presentation of said user interactive tool within said graphical user interface environment, said user interactive tool comprising a first selector portion having a plurality of regions and a plurality of axial controller portions extending outwardly from certain ones of said plurality of regions, wherein each of said axial controller portions is associated with a different axis of said at least one 3D object and comprises an axial movement selector portion, an axial rotation selector portion and an axial scaling selector portion;

receive input to the first selector portion to select a uniform scaling operation for uniformly scaling the at least one 3D object in 3D or a two-dimensional (2D) movement operation for moving the at least one 3D object in 2D;

receive input to the axial movement selector portion of one of the plurality of axial controller portions for moving the at least one 3D object along a corresponding axis;

receive input to the axial rotation selector portion of one of the plurality of axial controller portions for rotating the at least one 3D object about a particular axis; and     receive input to the axial scaling selector portion of one of the plurality of axial controller portions for non-uniformly scaling the at least one 3D object with respect to a corresponding axis.

22. The non-transitory computer readable medium as recited in claim 21, wherein said user interactive tool further comprises an indicator portion extending outwardly from at least one of said plurality of regions, said indicator portion being selectively positioned to not operatively occlude user selection of said first selector portion, and/or any of said axial movement selector portions, said axial rotation selector portions, and/or said axial scaling selector portions.

23. The non-transitory computer readable medium as recited in claim 22, wherein said first selector portion comprises at least one of a selectable region and/or a selectable feature, and wherein said indicator portion is associated with a selection of said at least one of said selectable region and/or said selectable feature.

24. The non-transitory computer readable medium as recited in claim 23, wherein said indicator portion is associated with a two-dimension movement controller.

25. The non-transitory computer readable medium as recited in claim 21, wherein said first selector portion comprises a uniform scaling selector portion.

* * * * *